(12) United States Patent
Crawford et al.

(10) Patent No.: US 10,140,618 B2
(45) Date of Patent: Nov. 27, 2018

(54) SYSTEM, METHOD, AND RECORDING MEDIUM FOR VEHICLE WEIGHT DETECTION

(71) Applicant: International Business Machines Corporation, Armonk, NY (US)

(72) Inventors: Catherine Helen Crawford, Carmel, NY (US); Inseok Hwang, Austin, TX (US); John Andrew Gunnels, Yorktown Heights, NY (US); Tomasz J. Nowicki, Fort Montgomery, NY (US); Grzegorz Michal Swirszcz, New Castle, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 246 days.

(21) Appl. No.: 15/188,295

(22) Filed: Jun. 21, 2016

(65) Prior Publication Data

US 2017/0364926 A1 Dec. 21, 2017

(51) Int. Cl.
*G01G 19/02* (2006.01)
*G06Q 30/00* (2012.01)
*G06F 17/30* (2006.01)
*G06Q 50/28* (2012.01)

(52) U.S. Cl.
CPC ......... *G06Q 30/018* (2013.01); *G01G 19/021* (2013.01); *G06F 17/30241* (2013.01); *G06Q 50/28* (2013.01)

(58) Field of Classification Search
CPC ............ G01G 19/021; G06F 17/30241; G06Q 50/28; G06Q 30/018
See application file for complete search history.

(56) References Cited

U.S. PATENT DOCUMENTS

| | | | |
|---|---|---|---|
| 8,364,439 B2* | 1/2013 | Mintz | G01G 19/021 280/735 |
| 2012/0209502 A1* | 8/2012 | Nichols | B62D 53/021 701/124 |
| 2014/0350756 A1* | 11/2014 | Schoonmaker | B61L 15/0081 701/19 |

* cited by examiner

*Primary Examiner* — Bryan Bui
(74) *Attorney, Agent, or Firm* — Jennifer R. Davis, Esq.; McGinn IP Law Group, PLLC

(57) ABSTRACT

A vehicle weight detection method, system, and non-transitory computer readable medium, include calculating a first difference between a first expected weight of a vehicle and a first current weight of the vehicle based on On-Board Dash (OBD) input data, calculating a second difference between a second expected weight of the vehicle and a second current weight of the vehicle based on a spring-mass-damper mechanical algorithm using vehicle data received from a user device, a comparing circuit configured to compare each of the first difference and the second difference to a predetermined weight difference threshold value, and a location checking circuit configured to checks if a location of the vehicle matches a location in a list of verified weight change locations of a database if the comparing circuit detects at least one of the first difference and the second difference is greater than the predetermined weight difference threshold value.

20 Claims, 8 Drawing Sheets

VEHICLE WEIGHT DETECTION METHOD 200

SYSTEM, METHOD, AND RECORDING MEDIUM FOR VEHICLE WEIGHT DETECTION

BACKGROUND

The present invention relates generally to a vehicle weight detection system, and more particularly, but not by way of limitation, to a system for using On-Board Dash (OBD) data concurrently with a spring-mass-damper mechanical-based calculation to determine if a change in vehicle weight is greater than a threshold value in order to detect fraudulent or improper activity.

Conventional vehicle weight calculation systems are based on expensive, specialized sensors. These sensors may or may not have connectivity to other devices so as to alert changes in vehicle weight which may be the result of fraudulent or improper activity and need immediate alerts such illegal dumping activities, fuel theft, illegal taxi service pickups, etc.

Also, lack of location information with change in weight detection is an impediment in the conventional techniques for determining if the change in weight was for valid reasons (e.g. package pickup or delivery at an appropriate address). Furthermore, the wear on external sensors, especially in rough road conditions, leads to loss of data due to sensor replacement.

Other conventional techniques for vehicle weight detection detect changes in vehicle weight using physical weigh stations or axle-mounted sensors. Other techniques have considered tires with stress-strain gauges but this requires special tires and is costly. Also, the weight stations are impractical for detecting weight for a car-sharing service to monitor employees.

SUMMARY

In view of the technical problem, the inventors have considered a non-abstract improvement to a computer technology via a technical solution to the technical problem in which a system can leverage analytics detected via mobile devices and/or OBD data in vehicles to detect changes in vehicle weight along with location detection and determination to detect fraudulent activity.

In an exemplary embodiment, the present invention can a vehicle weight detection system, including a first weight calculating circuit configured to calculate a first difference between a first expected weight of a vehicle and a first current weight of the vehicle based on On-Board Dash (OBD) input data, a second weight calculating circuit configured to calculate a second difference between a second expected weight of the vehicle and a second current weight of the vehicle based on a spring-mass-damper mechanical algorithm using vehicle data received from a user device, a comparing circuit configured to compare each of the first difference and the second difference to a predetermined weight difference threshold value, and a location checking circuit configured to checks if a location of the vehicle matches a location in a list of verified weight change locations of a database if the comparing circuit detects at least one of the first difference and the second difference is greater than the predetermined weight difference threshold value.

Further, in another exemplary embodiment, the present invention can provide a vehicle weight detection method, including first calculating a first difference between a first expected weight of a vehicle and a first current weight of the vehicle based on On-Board Dash (OBD) input data, second calculating a second difference between a second expected weight of the vehicle and a second current weight of the vehicle based on a spring-mass-damper mechanical algorithm using vehicle data received from a user device, comparing each of the first difference and the second difference to a predetermined weight difference threshold value, and checking if a location of the vehicle matches a location in a list of verified weight change locations of a database if the comparing detects at least one of the first difference and the second difference is greater than the predetermined weight difference threshold value.

Even further, in another exemplary embodiment, the present invention can provide a non-transitory computer-readable recording medium recording a vehicle weight detection program, the program causing a computer to perform: first calculating a first difference between a first expected weight of a vehicle and a first current weight of the vehicle based on On-Board Dash (OBD) input data, second calculating a second difference between a second expected weight of the vehicle and a second current weight of the vehicle based on a spring-mass-damper mechanical algorithm using vehicle data received from a user device, comparing each of the first difference and the second difference to a predetermined weight difference threshold value, and checking if a location of the vehicle matches a location in a list of verified weight change locations of a database if the comparing detects at least one of the first difference and the second difference is greater than the predetermined weight difference threshold value.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

Figure 1:
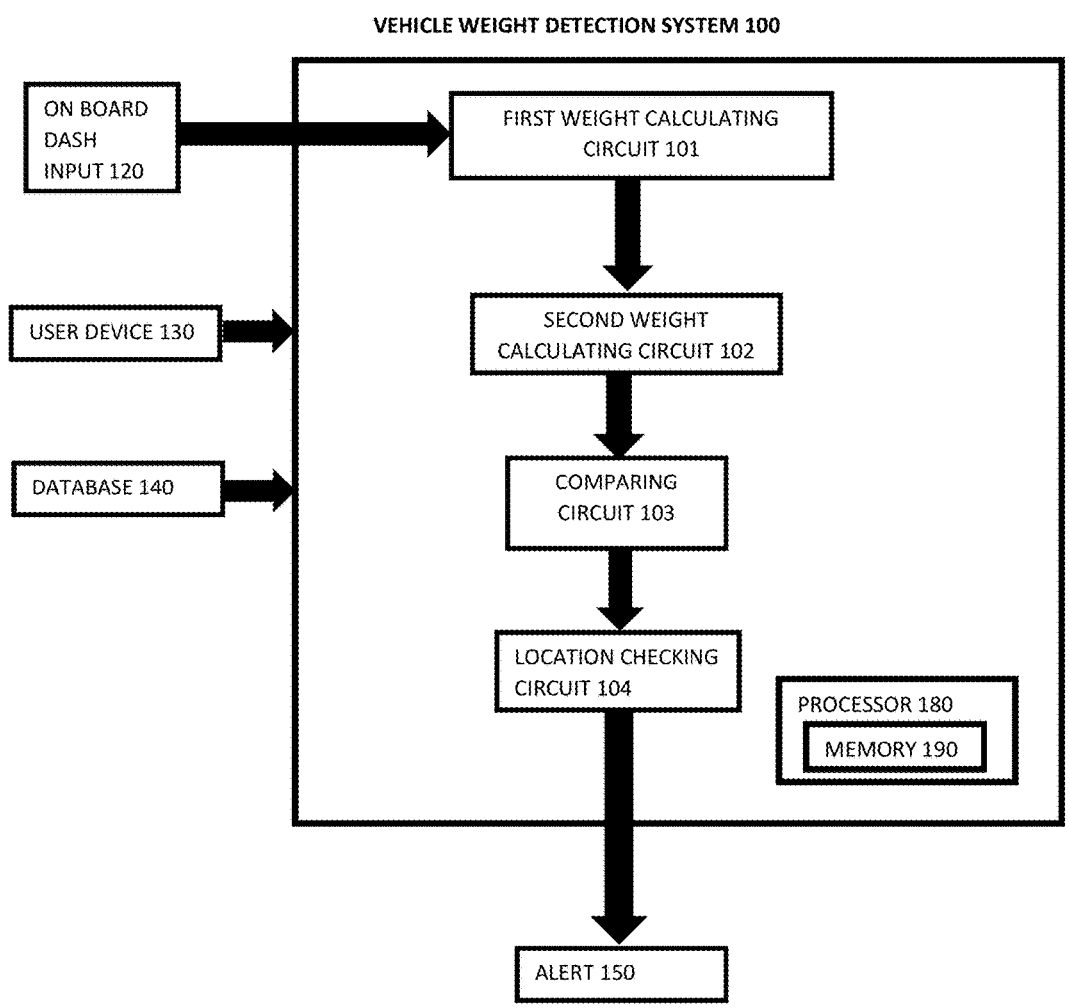
FIG. 1 exemplarily shows a block diagram illustrating a configuration of a vehicle weight detection system 100.

The invention will now be described with reference to FIGS. 1-8, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the vehicle weight detection system 100 includes a first weight calculating circuit 101, a second weight calculating circuit 102, a comparing circuit 103, and a location checking circuit 104. The vehicle weight detection system 100 includes a processor 180 and a memory 190, with the memory 190 storing instructions to cause the processor 180 to execute each circuit of the vehicle weight detection system 100. The processor and memory may be physical hardware components, or a combination of hardware and software components.

Although the vehicle weight detection system 100 includes various circuits, it should be noted that a vehicle weight detection system can include modules in which the memory 190 stores instructions to cause the processor 180 to execute each module of the vehicle weight detection system 100.

Also, each circuit can be a stand-alone device, unit, module, etc. that can be interconnected to cooperatively produce a transformation to a result.

With the use of these various circuits, the vehicle weight detection system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Cognitive states are defined as functions of measures of a user's total behavior collected over some period of time from at least one personal information collector (e.g., including musculoskeletal gestures, speech gestures, eye movements, internal physiological changes, measured by imaging circuits, microphones, physiological and kinematic sensors in a high dimensional measurement space, etc.) within a lower dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower dimensional feature space, is used to identify the emergence of a certain cognitive state(s) over that period of time. One or more exemplary embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a "cognitive state". The present application also describes the analysis, categorization, and identification of these cognitive states further feature analysis of subgraphs, including dimensionality reduction of the subgraphs, for example graphical analysis, which extracts topological features and categorizes the resultant subgraph and its associated feature nodes and edges within a subgraph feature space.

Figure 6:
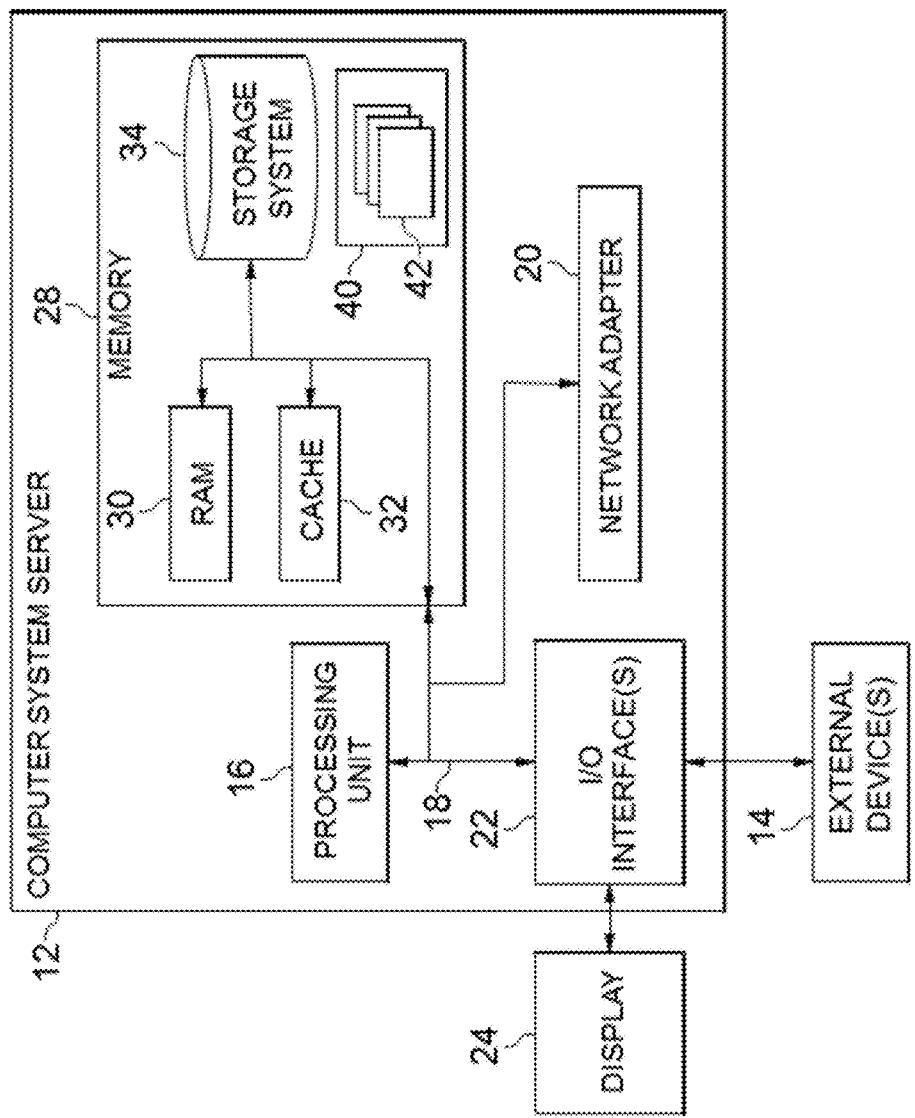
FIG. 6 depicts a cloud computing node 10 according to an exemplary embodiment of the present invention.
Figure 7:
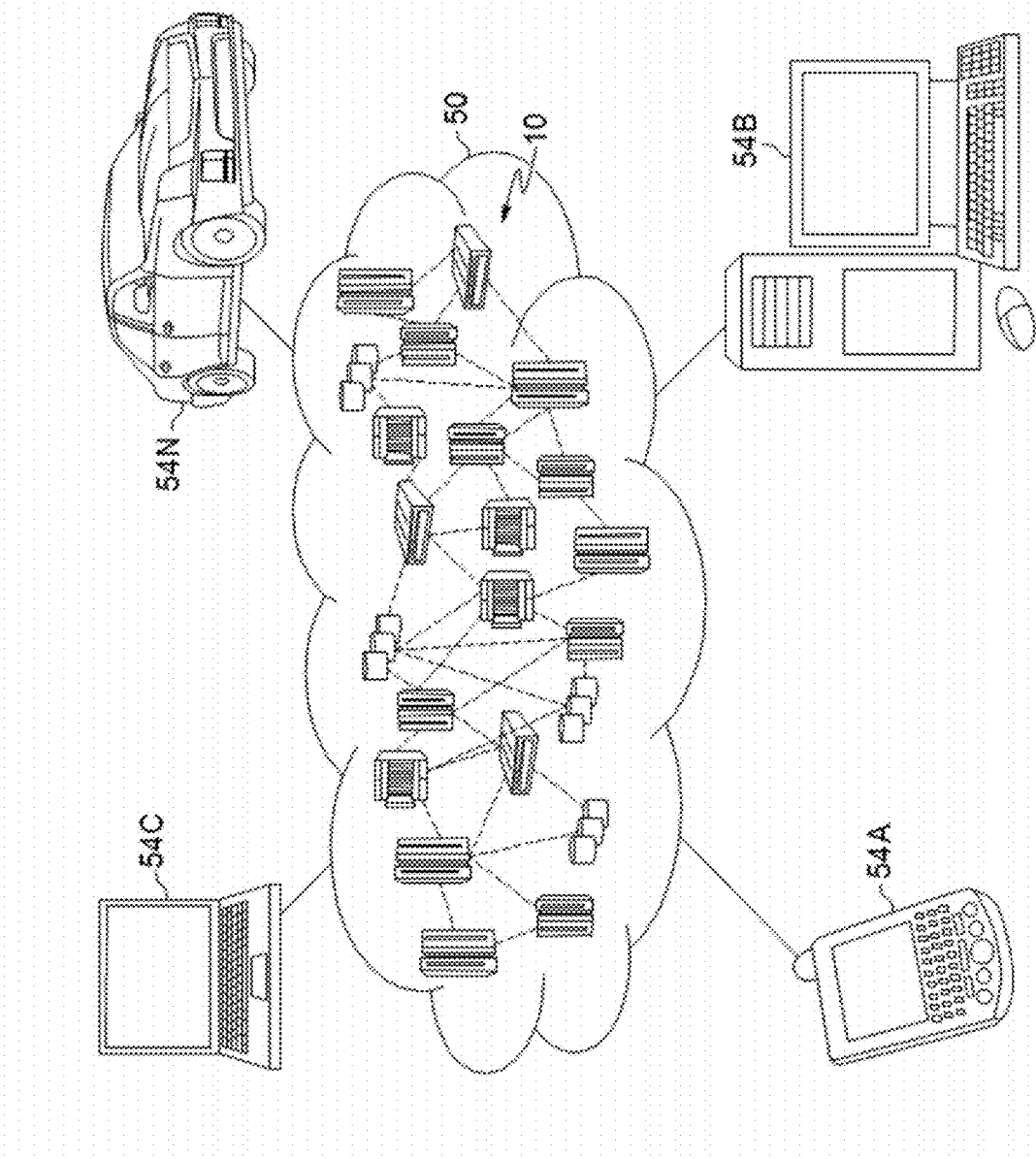
FIG. 7 depicts a cloud computing environment 50 according to another exemplary embodiment of the present invention.
Figure 8:
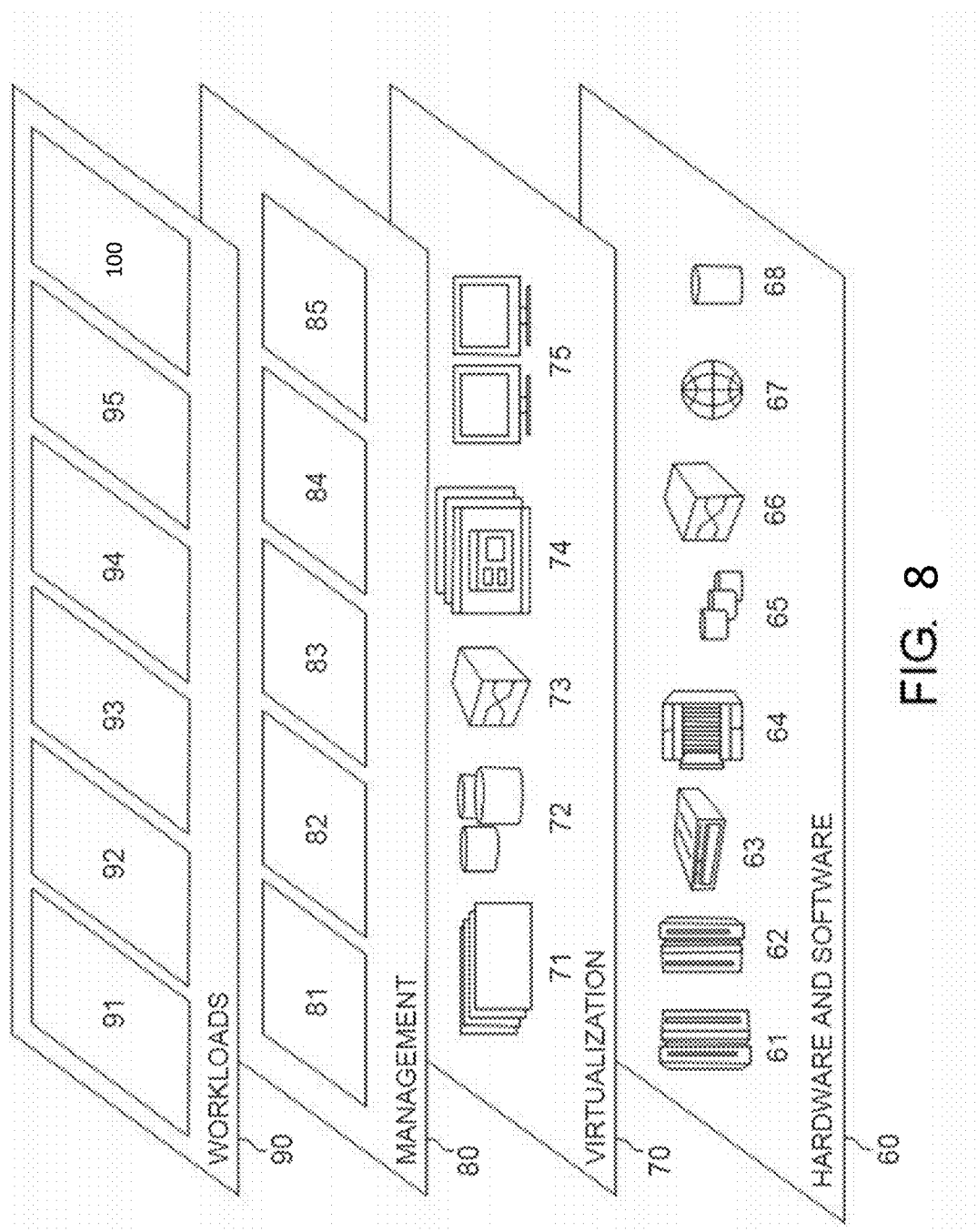
FIG. 8 depicts abstraction model layers according to an exemplary embodiment of the present invention.

Although as shown in FIGS. 6-8 and as described later, the computer system/server 12 is exemplarily shown in cloud computing node 10 as a general-purpose computing circuit which may execute in a layer the vehicle weight detection system 100 (FIG. 8), it is noted that the present invention can be implemented outside of the cloud environment.

The first weight calculating circuit 101 and the second weight calculating circuit 102 use two algorithms independently to calculate the current weight of the vehicle over time and the expected weight of the vehicle over time.

The system 100 can be entirely integrated into the user device 130 with the user device receiving the On-Board Dash input 120 directly. The availability of Global Positioning System (GPS) Sensors in the user device 130 along with location-based service Application Program Interfaces (APIs) allow the system 100 to correlate vehicle weight changes with geographic locations using the location checking circuit 104 (e.g., dumping station, filling station, delivery address, etc.), thus allowing a much more limited number of events being required to check the weight than to send all data to a centralized analytic service.

The first weight calculating circuit 101 receives On-Board Dash (OBD) data from the On-Board Dash input 120 and uses a first algorithm that leverages the OBD data to calculate the weight of the vehicle. The OBD data includes data from the vehicle's systems to calculate changes in vehicle mass (weight).

Using the known stoichiometric relations where "P(t)" for an engine is equal to the engine efficiency times the energy consumed per time. Setting "Engine Efficiency" to "e" and assuming that energy consumed per unit time is equal to the fuel mass per unit time multiplied by the energy divided by the fuel mass where the energy divided by the fuel mass is the fuel caloric value (CV) and the fuel mass per unit time is the Mass Air Flow (MAF) sensor reading divided by a stoichiometric ratio (St), the first equation is:

$$P(t)=(MAF/St)*e*CV \qquad (1)$$

Next, by setting P(t) equal to the Total Force to Move Vehicle time velocity of vehicle (v), where the Total Force to Move Vehicle is the "Force_inertia"+"Force_drag"+"Force_rollingresistance" with the "Force_inertia" equaling vehicle mass (m) times the velocity of vehicle (v), the "Force_drag" equaling "0.5" times the density of air (rho_air) times a Frontal Area of vehicle (A) times a Coefficient of Drag (C_d) time the velocity squared (v^2), and the "Force_rotationalresistance" equaling the vehicle mass (m) times gravity times a Coefficient of Rolling Resistance (C_RR), the second equation is:

$$P(t)=(m*a+0.5*rho\_air*A*C\_f*v^2+m*g*C\_RR)*v \qquad (2)$$

By solving equation (2) for "m" and setting equation (1) equal to equation (2):

$$m=(((MAF/St)*e*CV)/v-0.5*rho\_air*A*C\_d*v^2)*(1/(a+g*C\_RR)) \qquad (3)$$

The first weight calculating circuit 101 uses equation (3) and the OBD input 120 to solve for changes in mass of the vehicle over time. It is noted that there can be a tolerance-based on sensor data and because "C_RR" has a dependency on the mass of the vehicle and the road surface can increase the drag.

Also, assuming a constant velocity in equation (3) (e.g., the vehicle is traveling on a highway), equation (4) is used by the first weight calculating circuit 101:

$$m=(((MAF/St)*e*CV)/v-0.5*rho\_air*A*C\_d*v^2)*(1/g*C\_RR) \qquad (4)$$

Using either equation (3) or (4), the first weight calculating circuit 101 can detect a weight change of the vehicle. Also, the first weight calculating circuit 101 can calculate a weight increase because "MAF" measurements increase while all other values are the same. This means that the first weight calculating circuit 101 can calculate a larger value for "m" and detect the difference.

Thus, the first weight calculating circuit 101 receives the OBD input 120 from the OBD sensor at a specified time increment which can be variable based on vehicle speed such that the current weight of the vehicle can be calculated. In other words, the first weight calculating circuit 101 calculates an expected weight and a current weight of the vehicle based on the OBD input 120 of the vehicle operation as related to engine fuel consumption rates changing the weight of the vehicle.

The second weight calculating circuit 102 calculates the expected weight and current weight of the vehicle using a second algorithm based on a spring-mass-damper mechanical algorithm relying only on inputs received from a user device 130. That is, the second algorithm used by the second weight calculating circuit 102 uses data that can be detected by a conventional user device having a gyroscope, accelerometer, or the like.

The second algorithm will be described in derivation with reference to FIG. 3 using the example of a vehicle moving across a speed bump.

Figure 3:
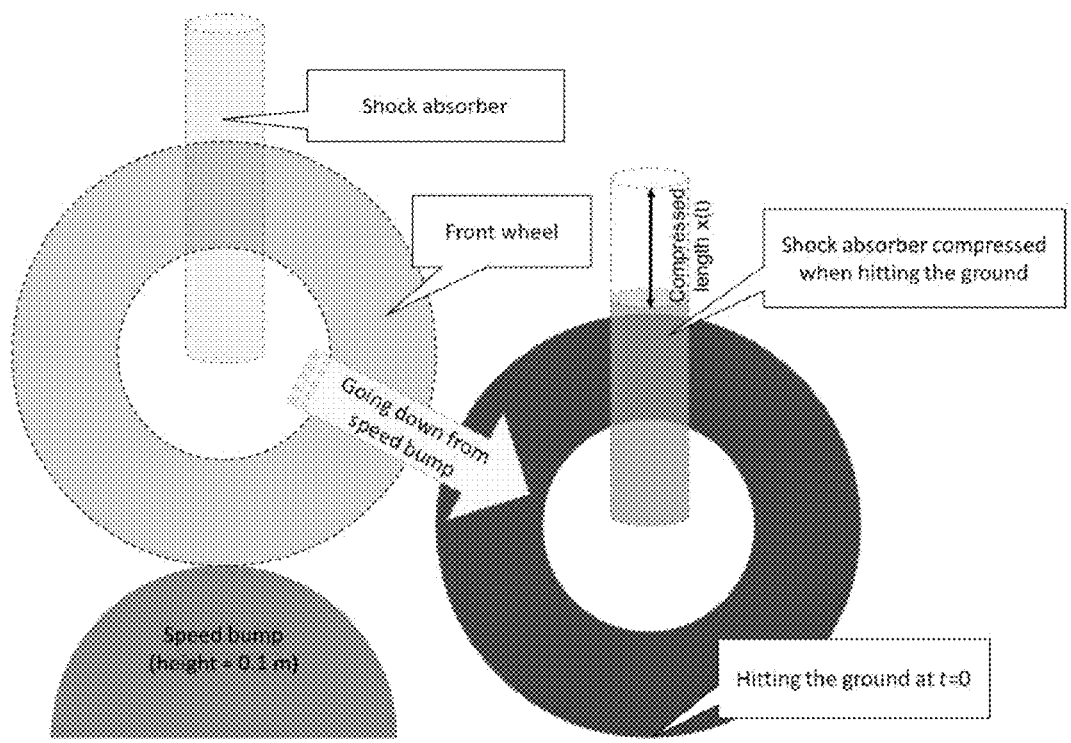
FIG. 3 exemplarily shows calculation variables used in calculating a weight of the vehicle by a second weight calculating circuit 102.

FIG. 3 depicts the vehicle moving forward and going down from a top of the speed bump, and its front wheels hit the ground at t=0. The shock absorber is compressed by the impact, oscillates, and eventually stabilizes at its normal length. It is noted that "speed bump" refers generally to a bump in a road and not necessarily to a speed bump in the conventional sense.

Further, x(t) is the length of displacement of the shock absorber at time t and x(0) is the compression when hitting the ground. Also, in deriving the second algorithm, it is assumed that the vehicle's longitudinal and lateral center of mass is located at the longitudinal center and the lateral center of the vehicle, respectively. Thus, the assumption on the center of mass location gives equal weight distribution on all of the four wheels such that the weight on a wheel is the weight divided by the number of wheels. Also, the speed bump has a known height h (set as 0.1 m in the exemplary FIGS. 4 and 5). Further, it is assumed that a gravitational potential energy at the top of the speed bump is 100% converted to the initial compression of the front shock absorber springs when hitting the ground.

By letting x(t) be the shock absorber spring's displacement at time=t and setting the zero point of x=0 when the shock absorber spring is stable with natural weight of the truck, the initial compressed distance x(0) is evaluated as follows starting with near-surface approx. gravitational potential energy:

$$mgh=(\text{Spring energy})=(\tfrac{1}{2})*k*x(0)^2 \qquad (5)$$

By solving equation (5) for x(0), and the result is equation (6) below.

$$x(0) = \sqrt{\frac{2mgh}{k}} \qquad (6)$$

Since t=0, the shock absorber dampens the shock and eventually reaches a stable displacement. The displacement t is thus described by the differential equation for dampening oscillation motion where c is the dampening coefficient:

$$\frac{d^2x(t)}{dt^2} + \frac{c}{m}\frac{dx(t)}{dt} + \frac{k}{m}x(t) = 0 \qquad (7)$$

Assuming that the shock absorber would exhibit under dampening motion, the solution of equation (7) is:

$$x(t) = e^{-\zeta\omega_0 t}(A\cos(\omega_d t) + B\sin(\omega_d t)) \qquad (8)$$

where $$\omega_0 = \sqrt{\frac{k}{m}} \cdot \omega_0\sqrt{1-\zeta^2}$$

$$\zeta = \frac{c}{2\sqrt{mk}}$$

$$A = x(0)$$

$$B = \frac{1}{\omega_d}\left(\zeta\omega_0 x(0) + \frac{dx(t)}{dt}\bigg|_{t=0}\right)$$

Figure 4:
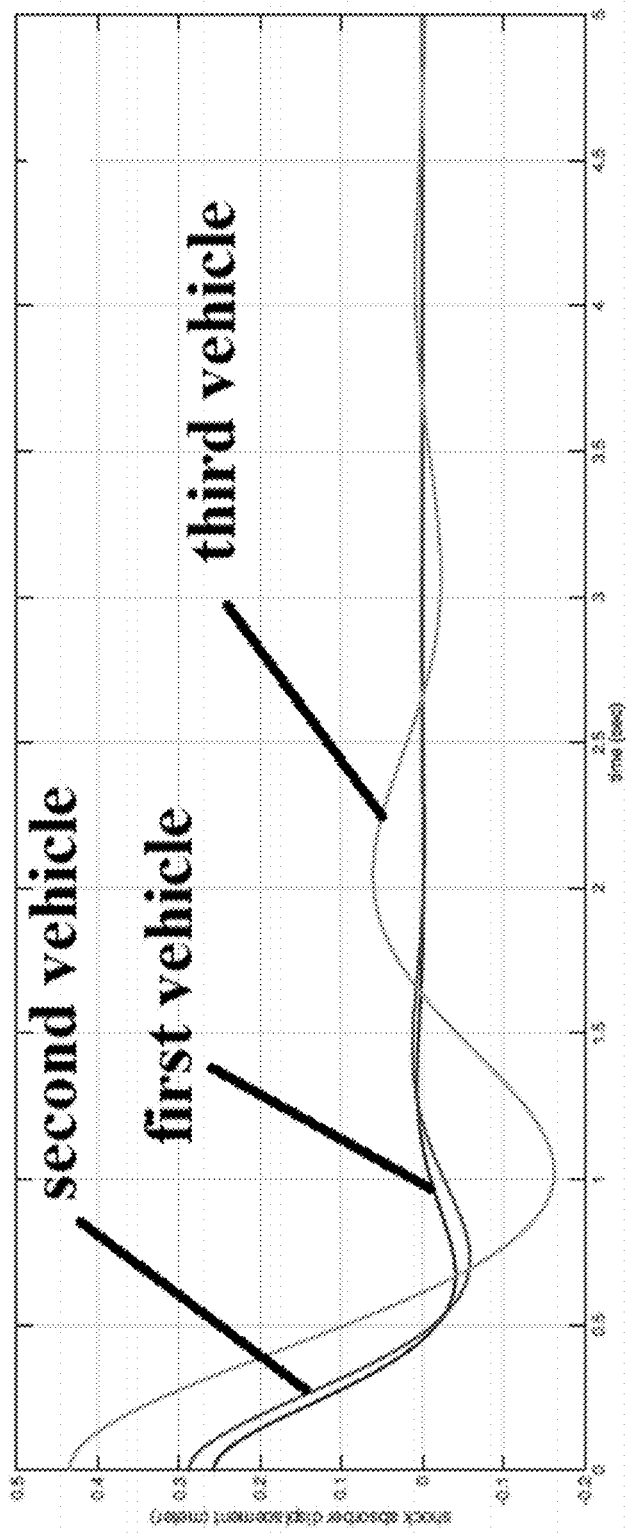
FIG. 4 exemplarily shows a result of the second weight calculating circuit 102.

FIG. 4 illustrates exemplary results using a commercial truck whose suspension specifications include a Cargo-free mass of 3640 kg (without driver, fuel, cargo, or tow) (e.g., a first vehicle of FIG. 4), a Gross Vehicle Mass (GVM) of 10,400 kg (includes max cargo but without tow) (e.g., a third vehicle of FIG. 4), a front shock absorber spring constant of 26,900 kg/m, and a rear shock absorber spring constant of 100,400 kg/m. Also, a model was tested using the commercial truck with a cargo weighing 25% of its empty weight (4,550 kg) (e.g., a second vehicle of FIG. 4).

FIG. 4 exemplarily shows simulated motion of the shock absorber's displacement for the above vehicle configurations with shock absorber displacement in meters being the Y-axis and time being the X-axis.

The results of FIG. 4 show that differences of oscillating motion caused by different vehicle weights. The second weight calculating circuit 102 can calculate a change of weight by using equations (5)-(8) from data collected by the user device 130 and the change in weight can be detected by observing amplitude of oscillation and/or time to get stabilized.

Figure 5:
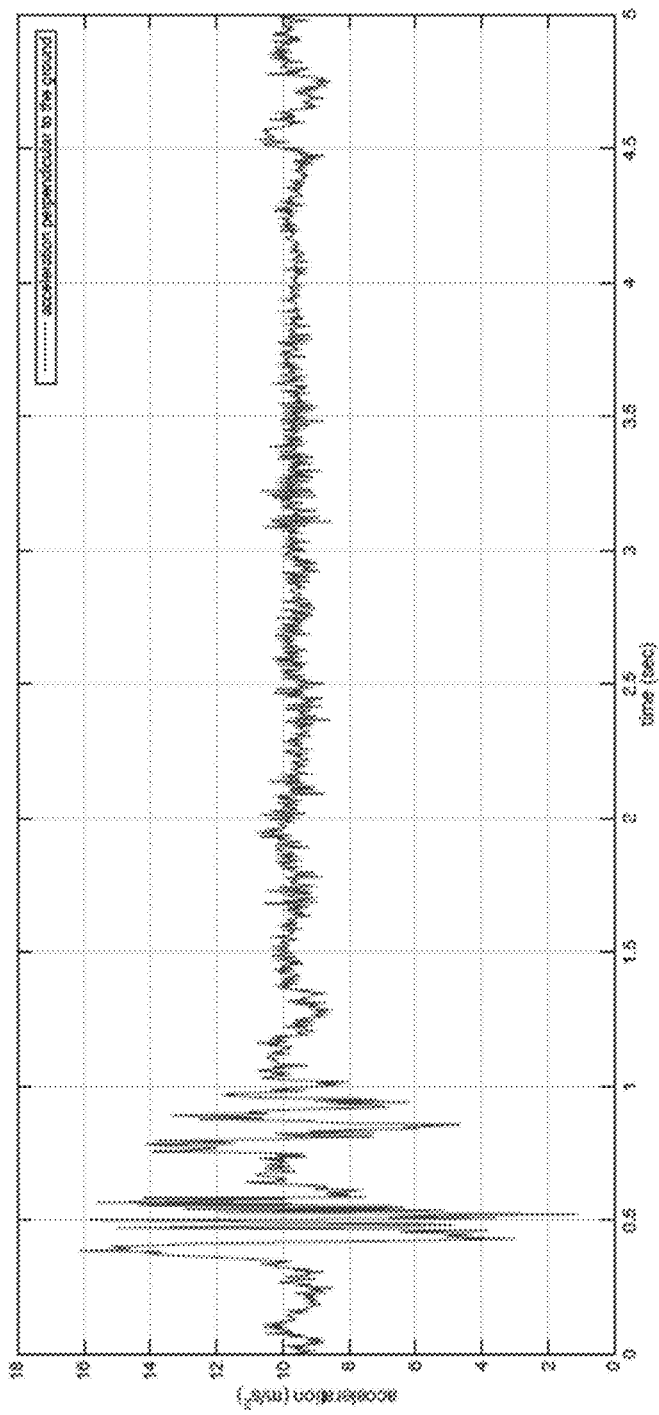
FIG. 5 exemplarily shows a time-plot of z-axis accelerometer values collected by a user device 130 for a vehicle without any passenger or cargo but a single driver is driving across a speed bump of approx. 0.1 meter height to empirically set a value of the dampening coefficient "c".

Note that it is not possible to analytically find the damping coefficient "c". To solve for a likely value of "c" for the second weight calculating circuit 102 to use, historical data can be used. For example, FIG. 5 depicts a time-plot of z-axis accelerometer values collected by the user device 130 for a passenger car without any passenger or cargo but a single driver is driving across a speed bump of approx. 0.1 meter height. From the observation below that the damping gets stabilized roughly for 1 second, we empirically set a value of c=5000. This can be done for each vehicle by the second weight calculating circuit 102.

Both of these algorithms using the data received by the On-Board dash input 120 and the user device 130 are computed by the first weight calculating circuit 101 and the second weight calculating circuit 102, and the comparing circuit 103 compares the results to an expected weight of the vehicle if there was not a change in weight. In other words, the comparing circuit 103 can use heuristics to determine the highest fidelity answer in terms of change of weight.

It is noted that the system 100 can be configured such that the first weight calculating circuit 101 and the second weight calculating circuit 102 only calculate weight changes before and after vehicle start/stop (e.g., based on velocity or vehicle engine speed being zero for a predetermined amount of time). Furthermore, if the OBD data is not available, the mechanical algorithm (e.g., the second weight calculating circuit 102) can be used on its own.

Each of the first weight calculating circuit 101 and the second weight calculating circuit 102 calculates the current weight and expected weight over time. The comparing circuit 103 determines if the calculated weight from either of the algorithms deviates above a threshold weight difference from the detected weight (e.g., a difference between the expected weight and the current weight is greater than a threshold value). That is, the comparing circuit 103 compares each calculated weight from both algorithms to an expected weight that the vehicle should be operating at based on normal operating and weight loss over time (i.e., via operational use of fuel). If the comparing circuit 103 detects a change of the current weight to the expected weight greater than the threshold weight difference for that vehicle, the comparing circuit 103 causes the location checking circuit 104 to detect the location of the vehicle.

The location checking circuit 104 uses GPS information retrieved from the user device 130 to correlate the detected change in weight with geolocation data. Thus, if the comparing circuit 103 detects a change above the threshold weight difference allowed, location checking circuit 104 uses location based services of the user device 130 to determine the vehicles location and compares the location to a valid set of locations based on static file inputs (e.g., as stored in the database 140). Valid locations can include known fueling locations, dumping locations, a start or end of the delivery route to indicate unloading of cargo (passengers), etc. If there is no valid location associated with the location of the vehicle at the time of the weight change, an alert 150 is triggered to notify, for example, a central operations center of the potential fraudulent activity.

In other words, if the comparing circuit 103 detects a weight change greater than the threshold value, the location checking circuit 104 checks location of the vehicle with valid weight change locations of the database 140 to detect if there is fraudulent or improper activity or not.

Also, if the comparing circuit 103 detects that the first weight calculating circuit 101 calculates a weight that is different (e.g., greater than a threshold percentage) from the weight calculated using the second weight calculating circuit 102, the comparing circuit 103 check the route traveled by the vehicle. That is, if the vehicle was going over bumps (e.g., good data for the second algorithm) or on a smooth surface (e.g., negligible data to use for the second algorithm) as this can affect the fidelity of the Mechanical Spring-Mass-Damper calculation. If the location checking circuit 104 determines that the vehicle traveled over a smooth road (e.g., the road condition satisfied a predetermined condition in which the road has no bumps greater than a predetermined tolerance value such as less than 0.1 meters), the weight calculated by the second weight calculating circuit 102 can be ignored and the comparing circuit 103 can cause the location checking circuit 104 to check for valid locations based only on the weight calculated by the first weight calculating circuit 101.

Historical data stored in the database 140 can also be used to resolve the differences in calculations between the two algorithms.

Figure 2:
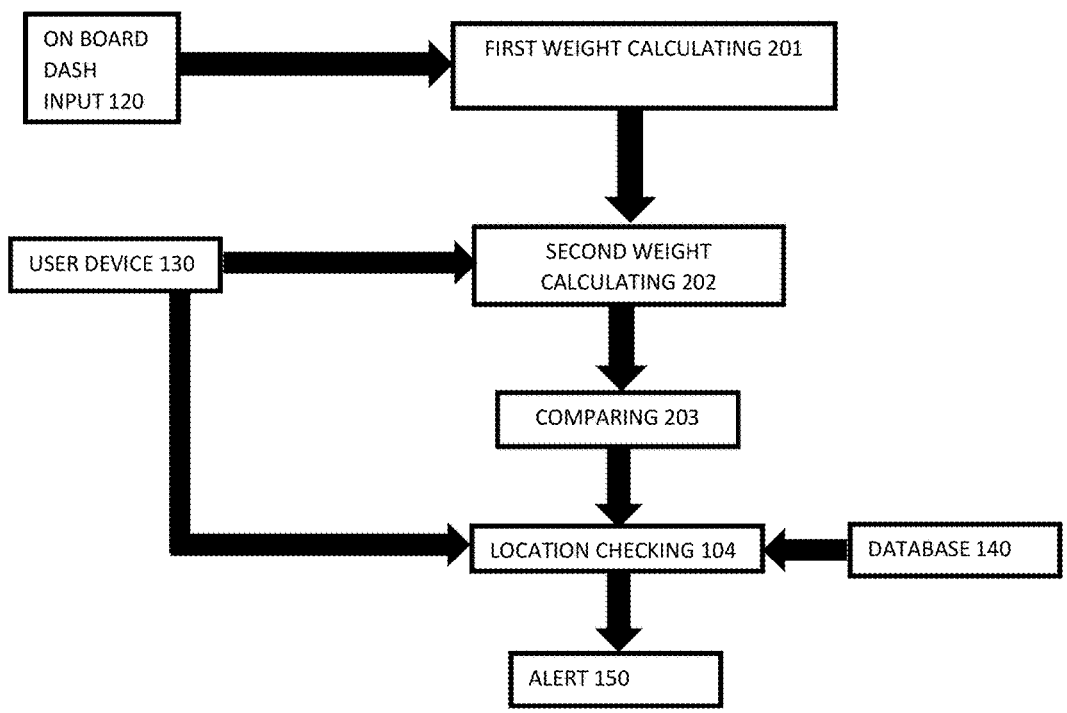
FIG. 2 exemplarily shows a high level flow chart for a vehicle weight detection method 200.

FIG. 2 shows a high level flow chart for a method 200 of vehicle weight detection.

Step 201 receives the OBD input 120 from the OBD sensor at a specified time increment which can be variable based on vehicle speed such that the current weight of the vehicle can be calculated. In other words, the first weight calculating circuit 101 calculates an expected weight and a current weight of the vehicle based on the OBD input 120 of the vehicle operation.

Step 202 calculates the expected weight and current weight of the vehicle using a second algorithm based on a spring-mass-damper mechanical algorithm relying only on inputs received from a user device 130.

Each of Step 201 and Step 202 calculates the current weight and expected weight over time and Step 203 compares the current weight and the expected weight and determines if the calculated weight from either of the algorithms deviates above a threshold weight difference from the detected weight (e.g., compares a difference between the expected weight and the current weight is greater than a threshold value). That is, Step 203 compares each calculated weight from both algorithms to the expected weight that the vehicle should be operating at based on normal operating and weight loss over time (i.e., via operational use of fuel).

Thereby, if Step 203 detects a change of the current weight to the expected weight greater than the threshold weight difference for that vehicle, Step 204 checks the location of the vehicle with verified weight change locations of the database 140. If the vehicle is in a location that weight change is expected (e.g., a dumping site, fuel station, etc.), Step 204 confirms the location is acceptable. If the location of the vehicle is not in a verified location, Step 204 sends an alert 150 for action to be taken to further inspect for fraudulent or improper activity.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 6, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 7, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 7 are intended to be illustrative only and that computing nodes 10 and cloud computing environment 50 can communicate with any type of computerized circuit over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the vehicle weight detection system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A vehicle weight detection system, comprising:
   a first weight calculating circuit configured to calculate a first difference between a first expected weight of a vehicle and a first current weight of the vehicle, each of the first expected weight of the vehicle and the first current weight of the vehicle being determined based on On-Board Dash (OBD) input data;
   a second weight calculating circuit configured to calculate a second difference between a second expected weight of the vehicle and a second current weight of the vehicle, each of the second expected weight of the vehicle and the second current weight of the vehicle being determined based on a spring-mass-damper mechanical algorithm using vehicle data received from a user device;
   a comparing circuit configured to compare each of the first difference and the second difference to a predetermined weight difference threshold value; and
   a location checking circuit configured to check if a location of the vehicle matches a location in a list of verified weight change locations of a database if the comparing circuit detects at least one of the first difference and the second difference is greater than the predetermined weight difference threshold value.

2. The system of claim 1, wherein the first weight calculating circuit calculates the first expected weight and the first current weight based only on the OBD input data.

3. The system of claim 1, wherein the second weight calculating circuit calculates the second expected weight and the second current weight based only on the vehicle data received from the user device.

4. The system of claim 1, wherein the spring-mass-damper mechanical algorithm is based on a potential energy change of the vehicle during travel.

5. The system of claim 1, wherein the On-Board Dash (OBD) input data comprises a fuel consumption rate.

6. The system of claim 1, wherein the location checking a circuit sends an alert if the location of the vehicle does not match a location in the list of verified weight change locations.

7. The system of claim 1, wherein the comparing circuit further compares the first difference to the second difference to detect if the first difference is different than the second difference by a value greater than a threshold value,
   wherein the comparing circuit causes the location checking circuit to check a route traveled by the vehicle to determine a road condition if the first difference is different than the second difference by the value greater than the threshold value, and
   wherein the comparing circuit ignores the second difference if the road condition is a predetermined condition.

8. The system of claim 7, wherein the predetermined condition comprises a road having no bumps greater than a predetermined tolerance value.

9. A vehicle weight detection method, comprising:
   first calculating a first difference between a first expected weight of a vehicle and a first current weight of the vehicle, each of the first expected weight of the vehicle and the first current weight of the vehicle being determined based on On-Board Dash (OBD) input data;
   second calculating a second difference between a second expected weight of the vehicle and a second current weight of the vehicle, each of the second expected weight of the vehicle and the second current weight of the vehicle being determined based on a spring-mass-damper mechanical algorithm using vehicle data received from a user device;
   comparing each of the first difference and the second difference to a predetermined weight difference threshold value; and
   checking if a location of the vehicle matches a location in a list of verified weight change locations of a database if the comparing detects at least one of the first difference and the second difference is greater than the predetermined weight difference threshold value.

10. The method of claim 9, wherein the first calculating calculates the first expected weight and the first current weight based only on the OBD input data.

11. The method of claim 9, wherein the second calculating calculates the second expected weight and the second current weight based only on the vehicle data received from the user device.

12. The method of claim 9, wherein the spring-mass-damper mechanical algorithm is based on a potential energy change of the vehicle during travel.

13. The method of claim 9, wherein the On-Board Dash (OBD) input data comprises a fuel consumption rate.

14. The method of claim 9, wherein the checking sends an alert if the location of the vehicle does not match a location in the list of verified weight change locations.

15. The method of claim 9, wherein the comparing further compares the first difference to the second difference to detect if the first difference is different than the second difference by a value greater than a threshold value,
   wherein the checking checks a route traveled by the vehicle to determine a road condition if the first difference is different than the second difference by the value greater than the threshold value, and
   wherein the comparing ignores the second difference if the road condition is a predetermined condition.

16. A non-transitory computer-readable recording medium recording a vehicle weight detection program, the program causing a computer to perform:
   first calculating a first difference between a first expected weight of a vehicle and a first current weight of the vehicle, each of the first expected weight of the vehicle and the first current weight of the vehicle being determined based on On-Board Dash (OBD) input data;
   second calculating a second difference between a second expected weight of the vehicle and a second current weight of the vehicle, each of the second expected weight of the vehicle and the second current weight of the vehicle being determined based on a spring-mass-damper mechanical algorithm using vehicle data received from a user device; comparing each of the first difference and the second difference to a predetermined weight difference threshold value; and
   checking if a location of the vehicle matches a location in a list of verified weight change locations of a database if the comparing detects at least one of the first difference and the second difference is greater than the predetermined weight difference threshold value.

17. The non-transitory computer-readable recording medium of claim 16, wherein the first calculating calculates the first expected weight and the first current weight based only on the OBD input data.

18. The non-transitory computer-readable recording medium of claim 16, wherein the second calculating calculates the second expected weight and the second current weight based only on the vehicle data received from the user device.

19. The non-transitory computer-readable recording medium of claim 16, wherein the spring-mass-damper mechanical algorithm is based on a potential energy change of the vehicle during travel.

20. The non-transitory computer-readable recording medium of claim 16, wherein the comparing further compares the first difference to the second difference to detect if the first difference is different than the second difference by a value greater than a threshold value,
  wherein the checking checks a route traveled by the vehicle to determine a road condition if the first different is difference than the second difference by the value greater than the threshold value, and
  wherein the comparing ignores the second difference if the road condition is a predetermined condition.

\* \* \* \* \*